(12) United States Patent
Moore, Jr.

(10) Patent No.: US 6,773,245 B2
(45) Date of Patent: Aug. 10, 2004

(54) FLUIDIC HOT AND COLD PRESSURE FORMING APPARATUS

(76) Inventor: Albert Edward Moore, Jr., 215 Grand Pre, L'Acadie, Quebec (CA), J2Y 1J6

( * ) Notice: Subject to any disclaimer, the term of this patent is extended or adjusted under 35 U.S.C. 154(b) by 222 days.

(21) Appl. No.: 09/967,566

(22) Filed: Sep. 27, 2001

(65) Prior Publication Data

US 2003/0059490 A1 Mar. 27, 2003

(51) Int. Cl.[7] .............................................. B29C 43/10
(52) U.S. Cl. ........................... 425/2; 425/169; 425/384; 425/389; 425/405.1
(58) Field of Search ........................... 425/2, 169, 384, 425/389, 405.1

(56) References Cited

U.S. PATENT DOCUMENTS

| | | | | |
|---|---|---|---|---|
| 3,614,811 A | * | 10/1971 | Johnson | 425/389 |
| 3,760,056 A | * | 9/1973 | Rudy | 264/299 |
| 3,823,293 A | * | 7/1974 | Gilliatt | 219/770 |
| 5,648,109 A | * | 7/1997 | Gutowski et al. | 425/504 |
| 5,857,358 A | * | 1/1999 | De Vries et al. | 65/106 |

* cited by examiner

Primary Examiner—James P. Mackey
Assistant Examiner—Donald Heckenberg
(74) Attorney, Agent, or Firm—Gene Scott-Patent Law & Venture Group

(57) ABSTRACT

An apparatus comprises a hot and a cold fluid reservoirs joined through a conduit and valving system to one or more pair of expandable bladders. A pump is engaged with the conduit system so as to enable the directing of the hot fluid from one of the reservoirs to one or more of the bladders and to enable directing the cold fluid from the other of the reservoirs to one or more of the other of the bladders. The bladders are mutually joined such that with either the hot or the cold bladders filled, both of the bladders are pressed against one or more workpieces, whereby heat is delivered to the workpieces when the one of the bladders, of each pair, is filled, and heat is extracted from the workpieces when the other, of each pair, of the bladders is filled while the other is deflated.

8 Claims, 3 Drawing Sheets

FLUIDIC HOT AND COLD PRESSURE FORMING APPARATUS

BACKGROUND OF THE INVENTION

1. Field of the Invention

This invention relates generally to forming operations and more particularly to a fluid based molding apparatus and method capable of delivering pressure and heat energy to a workpiece or withdrawal of heat energy from a workpiece.

2. Description of Related Art

The following art defines the present state of this field:

Rudy, U.S. Pat. No. 3,760,056 describes an improved method for custom fitting an inflatable bladder (e.g., for ski boots or the like) to a portion of a person's anatomy (e.g., a wearer's foot). The inflatable bladder is made of a suitable elastomer (e.g., ether base polyurethane) which may be heated, distended and then cooled to room temperature to set the bladder in the distended shape. A preferred embodiment of the improved method comprises placing the inflatable bladder on a wearer's foot, placing the boot to be worn on the wearer's foot over the bladder, heating the bladder, inflating the bladder to a desired pressure to force the bladder into intimate contact with the wear's foot and cooling the bladder to room temperature to set it in its distended shape. The bladder, which now conforms to the contour of the wearer's foot, is deflated and the boot and bladder are removed. When the bladder is later re-inflated, it will custom fit the wearer's foot. Preferably, the elastomer from which the bladder is made will return to its original shape when reheated. Thus, the bladder may be reheated to restore it to its original shape, and the process of the present invention may be re-employed to custom fit the bladder to a different foot.

Waters, U.S. Pat. No. 4,623,497 describes a mold for molding articles of plastic or other like materials, having a plurality of vertically extending internal passages, is connected by inlet and return conduits into a closed loop that includes a heat exchanger partially filled with a liquid supply of a cooling fluid or a heating fluid. For cooling the heat exchanger is positioned with its liquid level above the top of the mold, the inlet conduit connects the lower part of the heat exchanger, below the liquid level, to the lower ends of the mold passages, and the return conduit connects the upper ends of the mold passages to the upper part of the heat exchanger; for heating these relationships are reversed. In operation the fluid changes its physical state at critical points in the mold passages, going from liquid to vapor for cooling and from vapor to liquid for heating; circulation in the closed loop is in response to the effect of gravity. Operation of the heat exchanger is controlled to maintain a controlled pressure in the closed loop.

Maus et al., U.S. Pat. No. 5,376,317 describes an improved optical disk for information storage and holographic imaging, and optical lenses and reflective optical elements which are among the difficult-to-mold thermoplastic products which require precision replication of the molding surfaces, in micro detail. By heating (with circulating heat transfer fluids supplied by a hot side reservoir) these mold surfaces to a temperature setpoint sufficiently high to retard solidification and premature viscoelastic skinning of the molten thermoplastic injected into the mold cavity, superior quality molded surfaces can be formed by the plastic, which is then rapidly cooled to solidification (by circulating heat transfer fluids supplied from a cold side reservoir). Each injection molding cycle thus starts with a heating phase, wherein molding surface temperature increase is thermally driven by hot side reservoir fluid temperatures above the melt-solidifying temperatures (Tg or Tm) characteristic to the thermoplastic, followed by a cooling phase, wherein molding surface temperature decrease is thermally driven by cold side reservoir fluid temperatures below the melt-solidifying temperatures (Tg or Tm) characteristic to the thermoplastic. The greater these temperature differences are, the faster the molding cycle will be. Fluid control units and electronic process sequence control units are interconnected to govern the flow of these fluids into and out of the injection mold and the reservoirs in accordance with the predetermined logic of the process flowsheet.

Gaworowski et al., U.S. Pat. No. 5,795,536 describes a method and apparatus for the rapid, uniform curing of cylindrical, polymeric objects. The invention provides precise, accurate control of both the curing temperature and pressure because the heating system is independent of the pressurization device. Cylindrical polymeric objects are cured by mounting the object on a cylindrical mandrel, applying substantially uniform pressure to the outer surface of the object, typically through an expandable bladder, and supplying curing is heat directly to the object by circulating a liquid heat transfer medium through the bladder or mandrel. Preferably, the expandable elastomeric bladder is mounted coaxially with the mandrel, and is expanded with a suitable liquid or gas to provide the pressure. The liquid heat transfer medium can be pumped through a passage in the mandrel to apply heat directly to the interior of the object, or the liquid heat transfer medium may be used to expand the bladder and apply the curing heat to the exterior of the object. Alternatively, a combination of both techniques may be employed.

Kristinsson, U.S. Pat. No. 5,885,509 describes a prosthesis socket casting device including a base member on which an elongated annular molding bladder is mounted, the bladder peripherally enclosing a generally centrally located casting area and extendable when inflated from the forward side of the base. The bladder is formed of a pliable, air impermeable, relatively non-stretchable sheet material enclosing, in cooperation with the base, an air chamber peripherally surrounding the casting area. The casting area includes an open residual limb receiving end and extends from such end to the base, and an inflation system for the bladder is provided. The casting device may be used in conjunction with a prosthesis suction socket that includes a tension member at its distal end connectable to the base member during a casting procedure. Moldable and settable prosthesis socket or other moldable casting material is placed over the suction socket and is compression molded by the inflated bladder while the casting material cures. During the compression casting procedure, a tension force resulting from the bladder inflation pressure may be applied to the distal end of the suction socket to elongate and distend the distal area of the residual limb against which the casting material is formed under pressure. The bladder is rollable relative to the base member to provide ready access to the tension member connector carried by the base member.

Van Ert, U.S. Pat. No. 5,928,597 describes a method of thermoforming sheet articles including: a) heating a sheet article to be thermoformed; b) inserting the heated sheet article into a pressure vessel having first and second vessel halves, wherein each vessel half includes a liquid chamber and a thin shell configured for forming the sheet article to a desired shape; c) closing the pressure vessels such that the sheet article is captured between the thin shells; and d) providing liquid of equal pressure in each liquid chamber to force the thin shells together to form the sheet article to the desired shape and to draw heat away from the thin shells for cooling the sheet article.

Foltuz et al., U.S. Pat. No. 6,196,830 describes a water jacket assembly for use in injection mold systems, and particularly with heterocavity injection mold systems. The water jacket assembly comprises a sleeve construction of material with high heat-transfer properties. A conduit is beveled into the outside perimeter of the sleeve forming a circulation channel. The inside perimeter of the sleeve is fashioned to receive an individual injection mold. A mold base slideably received the water jacket and cooling fluid is circulated from the mold base through circulation channel in the water jacket, and then back to the mold base. A fluid input plug and fluid output plug extend from the mold base and are received by the apertures in the individual mold for additional cooling.

The prior art teaches the use of hot and cold fluids for thermoforming articles. Rudy, U.S. Pat. No. 3,760,056 teaches the inflation of a boot bladder while heat is applied to mold the bladder to the shape of a foot. The prior art does not teach the use of dual or paired bladders and dual fluid reservoirs (hot and cold) so that thermal energy may be quickly injected into the workpiece or withdrawn from the workpiece. The present invention fulfills these needs and provides further related advantages as described in the following summary.

SUMMARY OF THE INVENTION

The present invention teaches certain benefits in construction and use which give rise to the objectives described below.

The present invention is an apparatus comprising a hot and a cold fluid reservoirs joined through a conduit and valving system to one or more pair of expandable bladders. A pump is engaged with the conduit system so as to enable the directing of the hot fluid from one of the reservoirs to one ore more of the bladders and to enable directing the cold fluid from the other of the reservoirs to one or more of the other of the bladders. The bladders are mutually joined such that with either the hot or the cold bladders filled, both of the bladders are pressed against one or more workpieces, whereby heat is delivered to the workpieces when the one of the bladders, of each pair, is filled, and heat is extracted from the workpieces when the other, of each pair, of the bladders is filled while the other is deflated. Such an apparatus is useful for molding cast materials used in medicine to allow rapid forming. The present invention provides the advantages of applying a selectable pressure evenly to an injured portion of the body for applying cold or hot fluid, i.e., a cold or hot compress, as is known in the healing arts. The pressure and temperature may be applied to a cast for setting the cast to the exact shape of an arm, leg or other portion of the body. The same technique may be applied to forming the interior of boots, such as for skiing, mountain climbing and other sports, to the exact shape of the foot. The apparatus may also be used to pressure form plastics around a male mold or into a female mold to replace vacuum forming.

A primary objective of the present invention is to provide an apparatus and method of use of such apparatus that provides advantages not taught by the prior art.

Another objective is to provide such an invention capable of providing thermal energy to, or withdrawing it from, a workpiece.

A further objective is to provide such an invention capable of providing such thermal energy transfer while also applying hydraulic pressure to a workpiece surface.

A still further objective is to provide such an invention capable of being wrapped about a workpiece having a diameter selected from a range of diameters, i.e., the invention may accommodate a wider range of workpiece diameters.

A yet further objective is to provide such an invention capable of being operated only when a data transmission element of the invention is operating.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
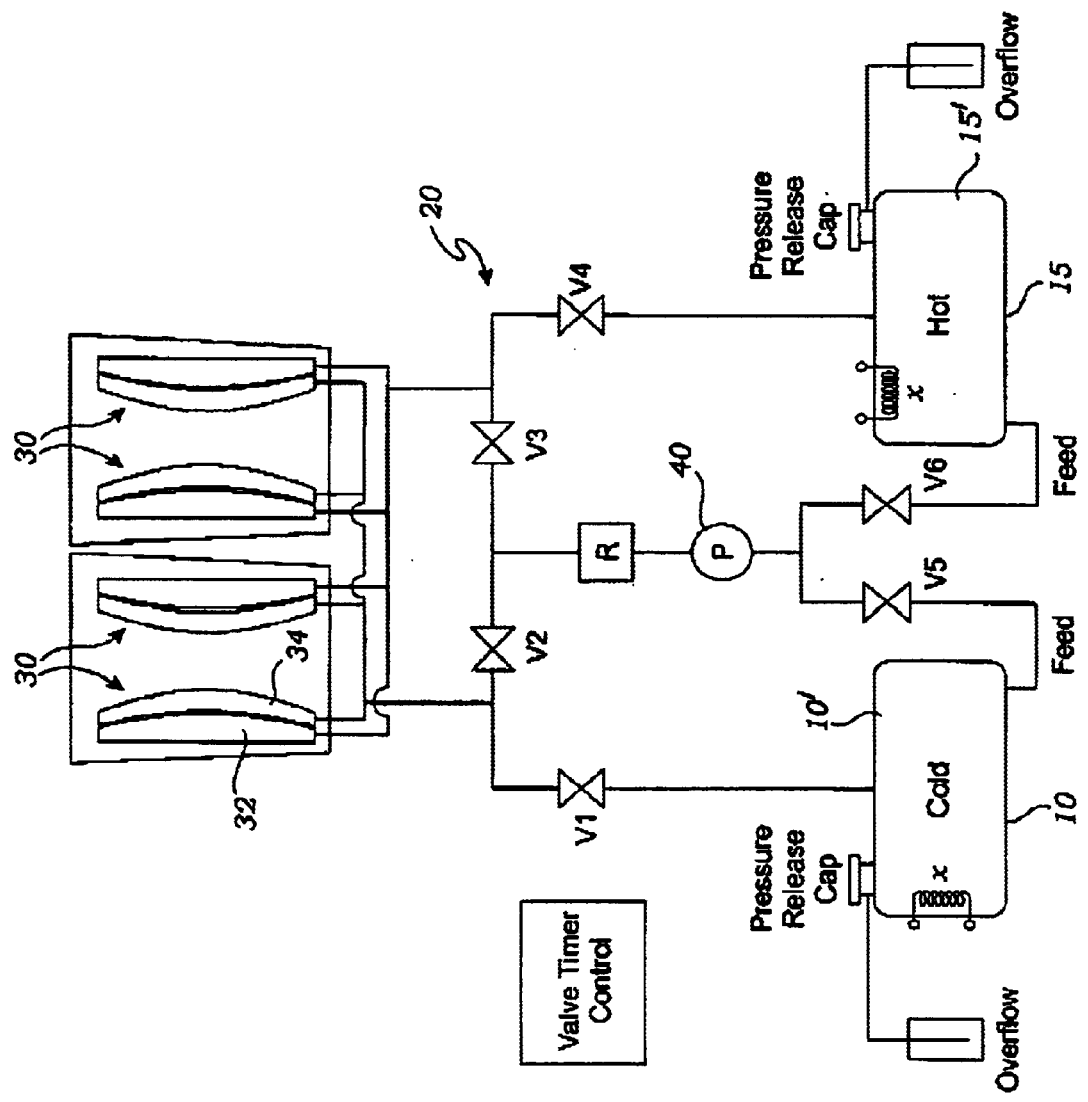
FIG. 1 is a mechanical schematic of a preferred embodiment of the invention shown with bladders of the invention deflated.
Figure 2:
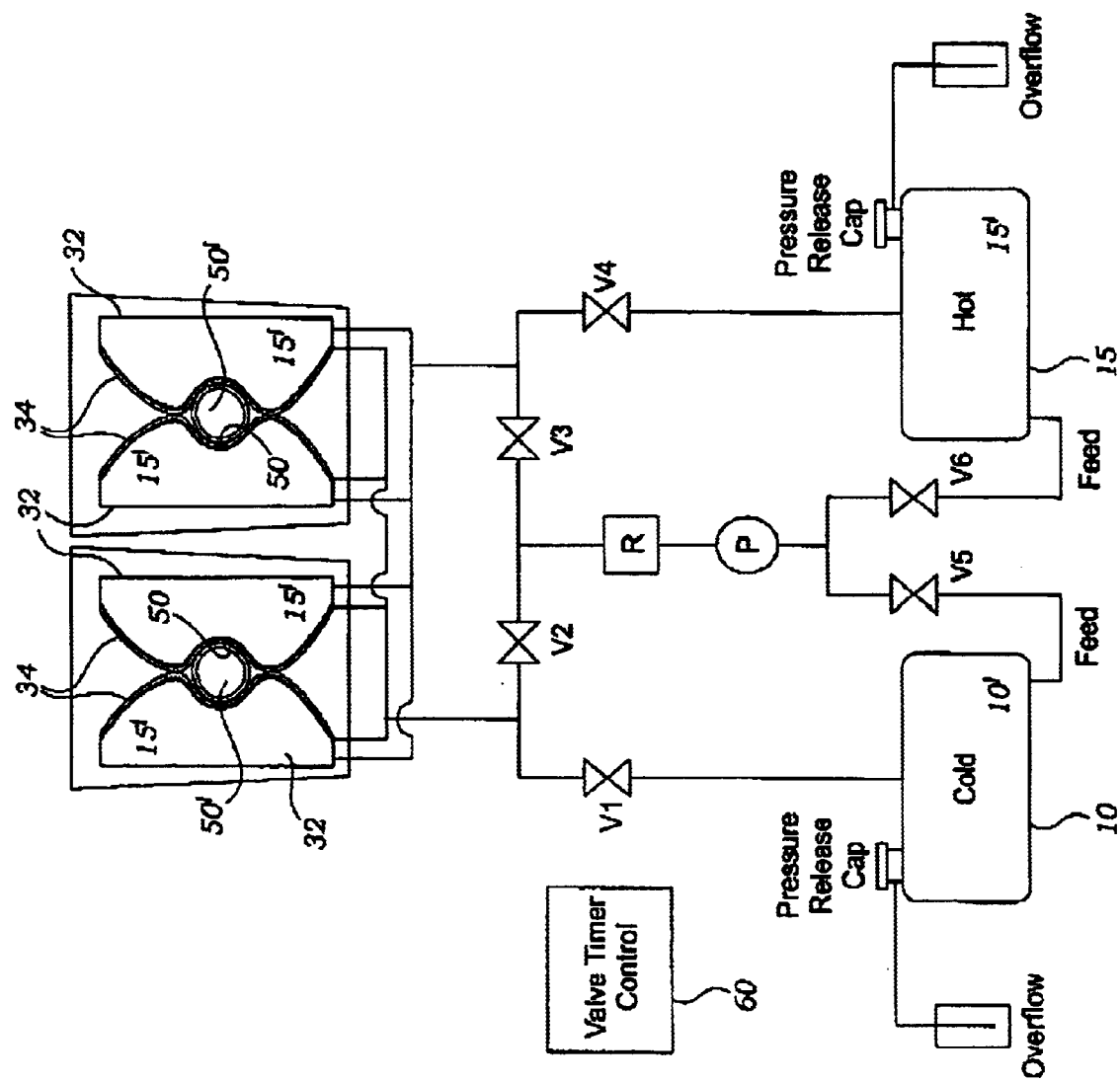
FIG. 2 is similar to FIG. 1 but showing the bladders as inflated with a hot fluid.

The present invention is an apparatus comprising, in one embodiment, shown in FIGS. 1 and 2, a pair of fluid reservoirs identified by numerals 10 and 15, which are joined through a conduit system 20 to plural pairs of expandable bladders 30. A pump 40 is engaged with the conduit system 20, as shown in FIG. 1, so as to enable the directing of a hot fluid 15' from the reservoir 15 to one of the bladders 32 of each pair of bladders 30, and to enable directing a cold fluid 10' from the reservoir 10 to the other of the bladders 34 in each pair. The bladders 32, 34 are mutually joined together such that when either of the bladders is filled with fluid (10' or 15'), both of the bladders 32, 34 are pressed against a workpiece 50, as shown in FIG. 2, due to the expansion of either one of the bladders. In FIG. 2 we see that bladders 32 are filled while bladders 34 are fully deflated. FIG. 2 serves to illustrate the expansion of either of the bladders 32 or 34 since the same result is achieved, i.e., the expansion of the bladder pair against the workpiece 50, although with opposite thermal flow. The bladder material is preferably selected for efficiently carrying thermal energy across it from the fluid to the workpiece or from the workpiece to the fluid. Such a material may be a carbon filled rubber.

Thus, heat is delivered to the workpiece 50 when the bladders 32 are filled, and heat is extracted from the workpiece 50 when the bladders 34 is filled. FIGS. 1 and 2 illustrate a setup whereby, for instance a pair of form fitting boot interiors may be formed to fit a person's feet. In this case, the bladders are forced, with pressure, against a thermally pliable boot liner (the workpiece 50), which is then forced into intimate contact with feet 50'. After the workpiece 50 is formed to the shape of the feet under pressure and heat driven by bladders 32 with fluid 15', the fluid 15' is very quickly drawn out of bladders 32 and fluid 10' is forced into bladders 34. This cold fluid 10' is then used to set the moldable workpiece 50. In an alternate embodiment, two pumps may be used to simultaneously draw one fluid out of one set of the bladders while the other set of the bladders is being filled. Generally, this is not necessary since the fluid may be moved rapidly between the bladders 32, 34 and the reservoirs 10, 15.

To understand how the conduit system operates, it is clear that when valves V4 and V6 are open, pump 40 is able to deliver hot fluid 15' to bladders 32. When V1 and V5 are open, pump 40 is able to deliver cold fluid 10' to bladders 34. This assumes that the remainder of the valves are all closed in both cases. To withdraw fluid from the bladders, V2 or V3 is then opened and V1 and V4 are closed for directing the cold 10' and the hot 15' fluids respectively. An electrical valve timer and controller 60, also referred to as a controlling means, is used to operate and sequence the valves. The controller 60 is therefore placed into electrical communication with the valves V1–V6 as is well known in the art. Controller 60 also controls a pressure regulator R and a heat exchanger X for setting the appropriate fluid pressure and temperatures for each application. Heat exchanger X may be a simple resistance heater or a true heat exchanger whereby a common heat pump is used to move thermal energy between the fluids in the reservoirs 10 and 15. Such a heat pump, it operation and structure is very well known in the art. The coil symbol for the heat exchangers X represent that portion of the heat pump that is immersed within the fluid for delivery or extraction of thermal energy.

Figure 3:
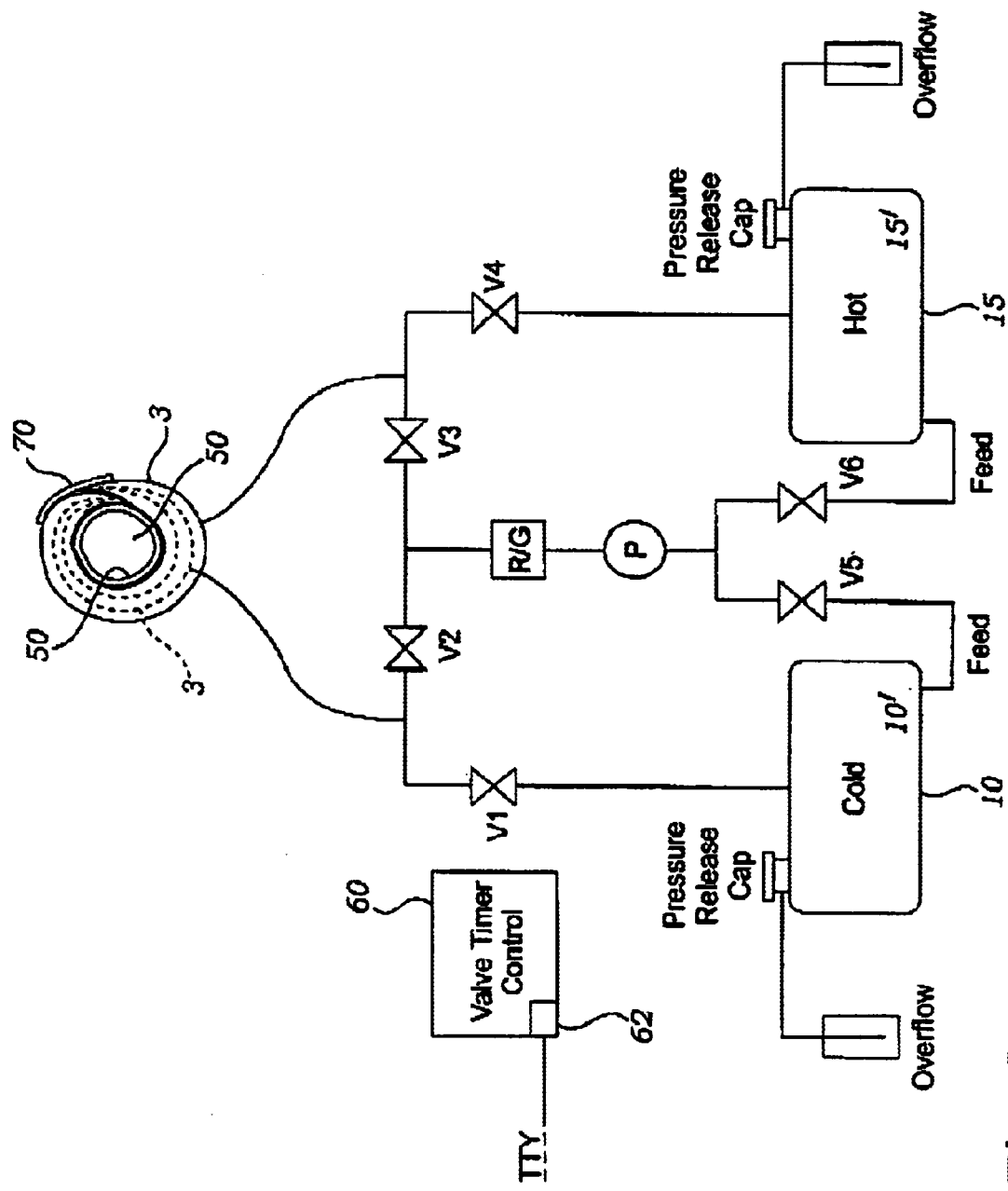
FIG. 3 is a mechanical schematic of a further preferred embodiment of the invention.

A slight variant on the above described system is shown in FIG. 3. In this case the pair of bladders 32, 34 are formed to encircle the workpiece 50, and a means for fastening 70 of the bladders in place about the workpiece is provided. In this approach, the bladders may be placed in face-to-face relationship as previously discussed, or they may be positioned one within the other, as is shown in FIG. 3. In this latter case, the two bladders are formed as a tube within a tube so that this tube assembly is able to be wrapped around a workpiece such as a moldable cast placed about an arm or a leg where a broken bone has been set. The Fastening means 70 may be Velcro® fastening materials so that the bladders may be wrapped to a selected tightness about the cast workpiece, and then easily fastened in place.

The controller 60 preferably is enabled for transmitting data corresponding to usage of the apparatus. This may be enabled in many ways, but preferably the controller is interconnected via the public telephone network, for instance, using a modem 62 connected to a telephony network TTY, to automatically make signal connection with a remote recording apparatus, such as a computer, for recording each time the present invention is used. In this way a billing-per-use accounting system may be set up and operated. This is shown in FIG. 3.

Preferably, the controlling means 60 is enabled for activating the apparatus only when data transmitting is operable. For instance, if the modem is not operating, or if the remote recording apparatus is not on-line, so as to receive a wait response from the remote recording apparatus at the controller, the controller will not operate. This insures proper recording for billing purposes. In this respect the controller is set with logic to process the method of the present invention, or instance when the following set of conditions are met: pressure in range, temperature of each fluid in range, valves, regulator and pump operating properly, remote recording apparatus on line.

The overflow and pressure cap devices shown in the figures are well known in the art in such fluid systems and are therefore not described further herein.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus comprising: a pair of fluid reservoirs joined through a conduit system to a pair of expandable bladders positioned for encircling a workpiece, a pump engaged with the conduit system so as to enable the directing of a hot fluid from one of the reservoirs to one of the bladders and to enable directing a cold fluid from the other of the reservoirs to the other of the bladders; the bladders mutually joined such that with one of the bladders filled, the one of the bladders is pressed against the workpiece, and with the other of the bladders filled, the pair of the bladders are pressed against the workpiece; whereby heat is delivered to the workpiece when the one of the bladders is filled, and heat is extracted from the workpiece when the other of the bladders is filled.

2. The apparatus of claim 1 further comprising a controlling means enabled for transmitting data corresponding to usage of the apparatus.

3. The apparatus of claim 2 wherein the controlling means is enabled for activating the apparatus only when data transmitting is operable.

4. The apparatus of claim 1 further comprising a means for exchanging heat energy between the hot fluid and the cold fluid.

5. An apparatus comprising: a pair of fluid reservoirs joined through a conduit system to two pair of expandable bladders positioned in opposing juxtaposition and spaced apart for receiving a workpiece therebetween, a pump engaged with the conduit system so as to enable the directing of a hot fluid from one of the reservoirs to one of the bladders in each of the pairs of the bladders, and to enable directing a cold fluid from the other of the reservoirs to the other of the bladders in each of the pairs of the bladders; each of the pairs of the bladders mutually joined such that with one of the bladders of each of the pairs of the bladders filled, one of the bladders of each of the pairs of bladders is pressed against one of two opposing sides of a workpiece, whereby heat is delivered to the workpiece when the one of the bladders of each of the pairs of bladders are filled, and heat is extracted from the workpiece when the other of the bladders of each of the pairs of the bladders are filled.

6. The apparatus of claim 5 further comprising a controlling means enabled for transmitting data corresponding to usage of the apparatus.

7. The apparatus of claim 6 wherein the controlling means is enabled for activating the apparatus only when data transmitting is enabled.

8. The apparatus of claim 5 further comprising a means for exchanging heat energy between the hot fluid and the cold fluid.

* * * * *